US011867465B2

(12) United States Patent
Žd'árský et al.

(10) Patent No.: US 11,867,465 B2
(45) Date of Patent: Jan. 9, 2024

(54) HEATER

(71) Applicant: FARMET a.s., Česká Skalice (CZ)

(72) Inventors: Karel Žd'árský, Hradec Králové (CZ); Josef Štěpánek, Borová (CZ)

(73) Assignee: FARMET a.s., Ceská Skalice (CZ)

( * ) Notice: Subject to any disclaimer, the term of this patent is extended or adjusted under 35 U.S.C. 154(b) by 533 days.

(21) Appl. No.: 16/969,053

(22) PCT Filed: Feb. 12, 2019

(86) PCT No.: PCT/CZ2019/000008
§ 371 (c)(1),
(2) Date: Aug. 11, 2020

(87) PCT Pub. No.: WO2019/158134
PCT Pub. Date: Aug. 22, 2019

(65) Prior Publication Data

US 2021/0033342 A1 Feb. 4, 2021

(30) Foreign Application Priority Data

Feb. 14, 2018 (CZ) .................................. CZ2018-73

(51) Int. Cl.
*F28C 3/14* (2006.01)
*F28D 21/00* (2006.01)
(Continued)

(52) U.S. Cl.
CPC .............. *F28C 3/14* (2013.01); *F26B 17/126* (2013.01); *F28D 9/00* (2013.01); *F28D 21/0001* (2013.01);
(Continued)

(58) Field of Classification Search
CPC .. F26B 17/126; F28C 3/12; F28C 3/14; F28D 9/00; F28D 21/0001; F28D 21/0045; F28D 21/0063
See application file for complete search history.

(56) References Cited

U.S. PATENT DOCUMENTS 3,397,460 A 8/1968 Hall
5,919,406 A * 7/1999 Bachofen .............. F24F 5/0007 261/153
(Continued)

FOREIGN PATENT DOCUMENTS

DE 39 11 716 A1 10/1990
EP 2 995 898 A2 3/2016
WO 2017/085050 A1 5/2017

OTHER PUBLICATIONS

International Search Report and Written Opinion for corresponding International Patent Application No. PCT/CZ2019/000008 dated Jul. 12, 2019.

*Primary Examiner* — Eric S Ruppert
*Assistant Examiner* — Hans R Weiland
(74) *Attorney, Agent, or Firm* — Renner, Otto, Boisselle & Sklar, LLP

(57) ABSTRACT

A heater, especially an oilseed heater (15) comprising an insulated jacket (2) which contains a material inlet (3), a material outlet (4), a heating medium inlet (5) and an air outlet (6) and where at least one exchanger (7) for condensation of evaporation residues is arranged inside the insulated jacket (2) and connected with the source (1) of the evaporation residues.

11 Claims, 4 Drawing Sheets

Figure 1:
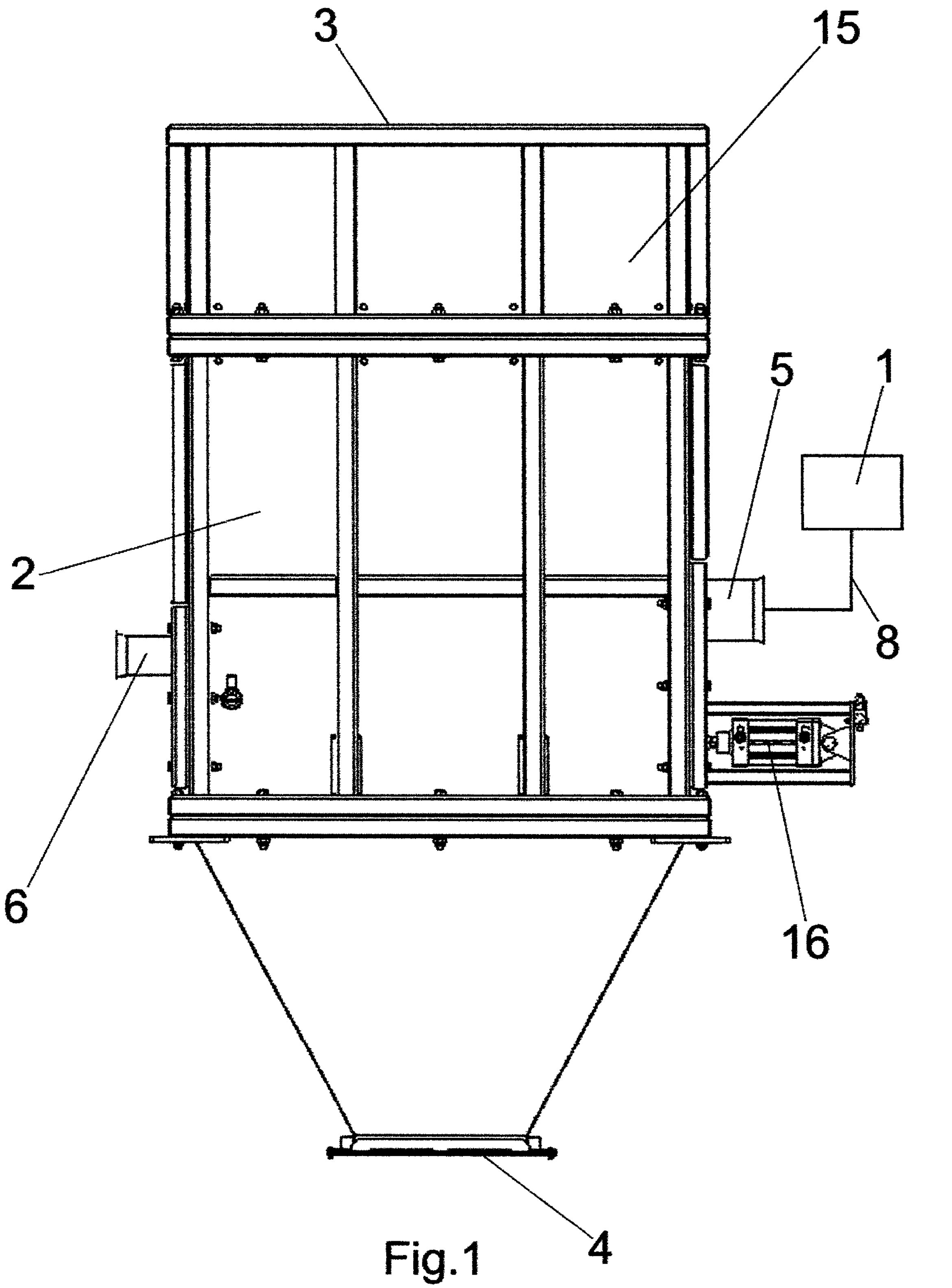

(51) Int. Cl.
*F26B 17/12* (2006.01)
*F28D 9/00* (2006.01)

(52) U.S. Cl.
CPC ................ *F28D 2021/0045* (2013.01); *F28D 2021/0063* (2013.01)

(56) References Cited

U.S. PATENT DOCUMENTS

| | | | | |
|---|---|---|---|---|
| 7,273,516 | B2 * | 9/2007 | Weidmann | F28D 5/00<br>261/153 |
| 9,371,503 | B2 * | 6/2016 | Le Clef | C11B 1/10 |
| 2004/0154184 | A1 * | 8/2004 | Bloemendaal | F26B 17/126<br>34/391 |
| 2007/0256316 | A1 * | 11/2007 | Jordison | F26B 17/122<br>34/65 |
| 2013/0292093 | A1 | 11/2013 | Huang et al. | |
| 2014/0246184 | A1 * | 9/2014 | Byman | F28F 3/044<br>165/166 |
| 2015/0298970 | A1 * | 10/2015 | Wong | B01J 38/60<br>422/187 |
| 2017/0045296 | A1 * | 2/2017 | Byman | F27B 1/10 |

* cited by examiner

HEATER

TECHNICAL FIELD

The invention concerns a heater, especially an oilseed heater comprising an insulated jacket which contains a material inlet, a material outlet, a heating medium inlet and an air outlet and where at least one exchanger is arranged inside the insulated jacket.

STATE OF THE ART

The existing state of the art knows quite a number of loose materials heaters including oilseed heaters.

Patent Document EP2995898 describes a heat exchanger containing a jacket which contains an inlet to supply loose materials and an outlet to carry loose materials away. The heat exchanger further contains several separate and, in the main, parallel sets of plates for heat transfer located inside the jacket between the loose material inlet and outlet. The loose materials flow from the inlet through the spaces between the sets of heat-transferring plates and through at least two manipulating gas zones where the first manipulating gas zone contains an inlet hole through which the gas is, in pulsating manner, supplied into the jacket and where the second manipulating gas zone, separated from the first one, contains an outlet hole through which the gas is carried away from the jacket. Both the manipulating gas zones are arranged between the inlet and outlet in order to facilitate the pulsing gas flow into the jacket, around the loose materials and out of the jacket.

A heating device with a radiator-type exchanger that can be used for the preheating of oilseeds is also known from U.S. Pat. No. 3,397,460.

In addition to the above, there exist heating devices where the heating medium is hot air or hot steam which flow directly through the loose material itself. There is, however a disadvantage consisting of the fact that the loose material usually becomes wetted during the heating process.

Another disadvantage of the solutions and designs that are known so far is the fact that they need a special source of energy for the heating medium or that they must be connected to a central energy distribution system in order to function properly. In both the cases, they use the energy that has to be produced especially for them.

The goal of this invention is to design a loose material heater, especially to design a heater to preheat oilseeds which will not need any special source of heating medium for its proper functioning. To be more precise, it will not need any source of energy to produce the heating medium intended especially for its proper functioning and, at the same time, the heated loose material will not become undesirably wetted during the heating process.

Principle of the Invention

The aforementioned weaknesses are, to a large extent, eliminated and the goals of the invention accomplished by such a heater, especially by such an oilseed heater that comprises an insulated jacket containing a material inlet, a material outlet, a heating medium inlet and an air outlet and where at least one heat exchanger is arranged inside the insulated jacket according to the invention the nature of which lies in the fact that the exchanger is an exchanger for condensation of evaporation residues connected with the source of waste evaporation residues. The evaporation residues are a mixture of air and vapour at atmospheric pressure.

The advantage of this design is the fact that the waste process heat (which is usually exhausted out of the building through ventilation or exhausting systems) can be used as the heating medium.

Advantageously, the source of the evaporation residues is a device to process biological materials with a certain degree of humidity the processing of which generates a considerable amount of heat. An example of such a device can be any device from the oilseed processing line or any device from extruded food line or from extruded feeding-mixture) line. The advantage lies in the fact that the waste energy produced by devices in the production line can, with minimum capital costs, be used in the heater according to this invention which is part of the line.

It is advantageously an extruder that can be used as the source of evaporation residues but it can also be a crusher/masher or a drier.

It is advantageous if the exchanger for condensation of evaporation residues is a plate-type exchanger as the technical design of such an exchanger is simple and relatively effective.

It is further advantageous if the exchanger for condensation of evaporation residues is connected by an insulated pipe (vapour line) to the source of the evaporation residues. The advantageous feature of this design is the fact that the vapours do not condense in the pipe but only after they get into the exchanger.

The heater further advantageously contains a condensate exhaust.

It is also advantageous if at least one travelling grate is arranged under the exchanger for condensation of evaporation residues. The travelling grate ensures continuous movement of the material through the whole heater and prevents its choking.

It is advantageous if the heater further contains a cleaning bar and if this cleaning bar is, in the advantageous design, provided with holes which are directed to the inside of the exchanger for condensation of evaporation residues. The advantage lies in the fact that the inner space of the exchanger between individual plates is easy to clean. Another advantage consists in the fact that the cleaning bar can optionally be used as a means to preheat the heater.

It is further advantageous if the heater is also provided with a temperature sensor arranged at the material inlet. It is advantageous because the pre-selected temperature (and thus the possibility of its regulation) can easily be checked. To be more precise, the temperature sensor provides operators with quick information about the temperature of the material on the understanding that in case of undesirable or unsatisfactory temperature, it can be quickly changed using the temperature-regulating means which the heater is provided with.

It is extremely advantageous if the air outlet is provided with a device facilitating forced exhaust. The advantage of such a device is the fact that by changing its parameters, the temperature of outgoing material can easily be regulated. In other words, the rate of condensation of evaporation residues (and thus also the heating capacity of the exchanger for condensation of evaporation residues) can be regulated.

The exchanger for condensation of evaporation residues is advantageously provided with a distribution space and with a space for air and condensate exhaust.

The main advantage of the structural design according to this invention is the utilization of waste heat which is, at the present time, idly released into the outside space without any use. The structural design according to this invention brings lower energy demandingness, lower energy costs and a lower environmental burden.

OVERVIEW OF THE FIGURES

Figure 2:
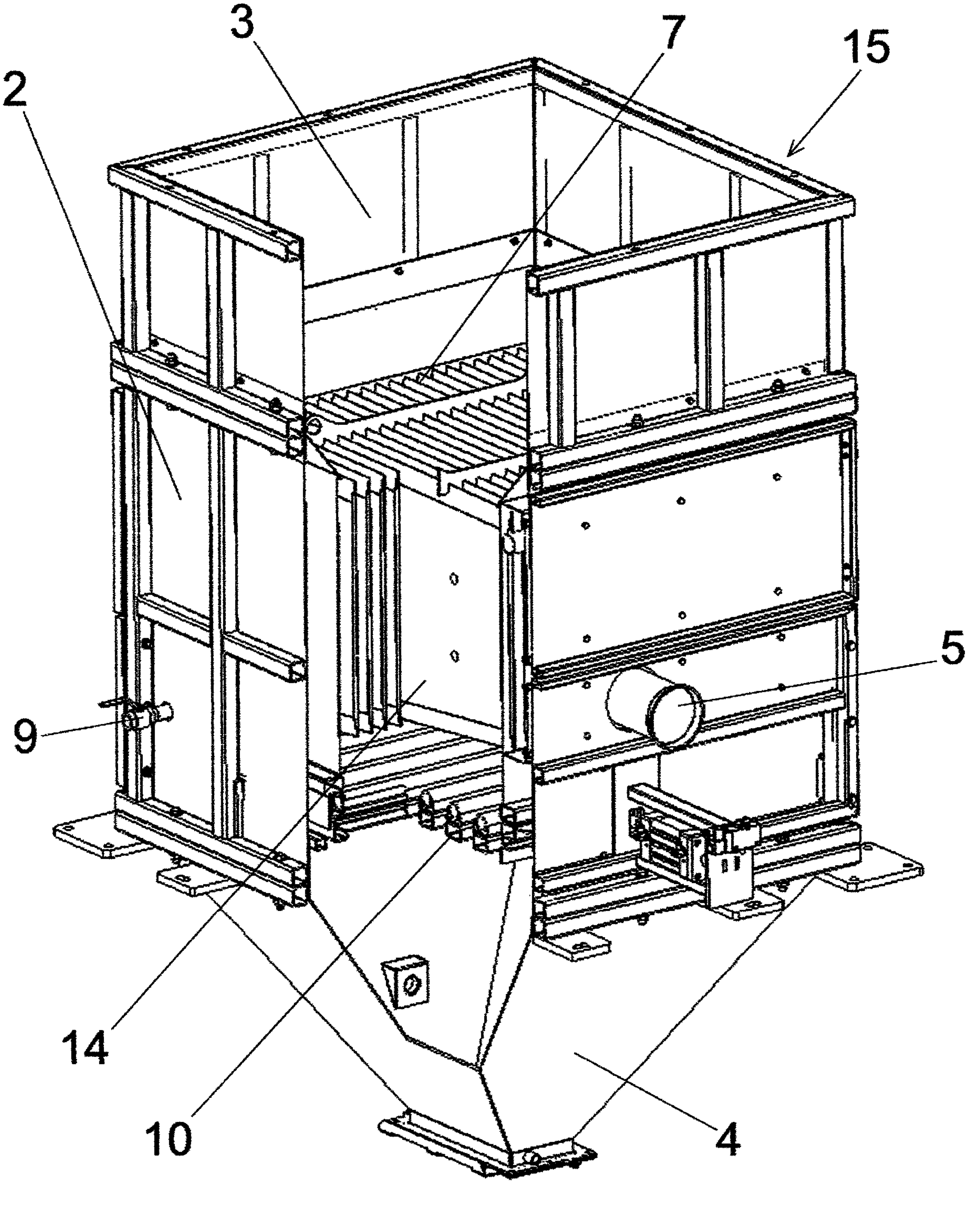
Figure 3:
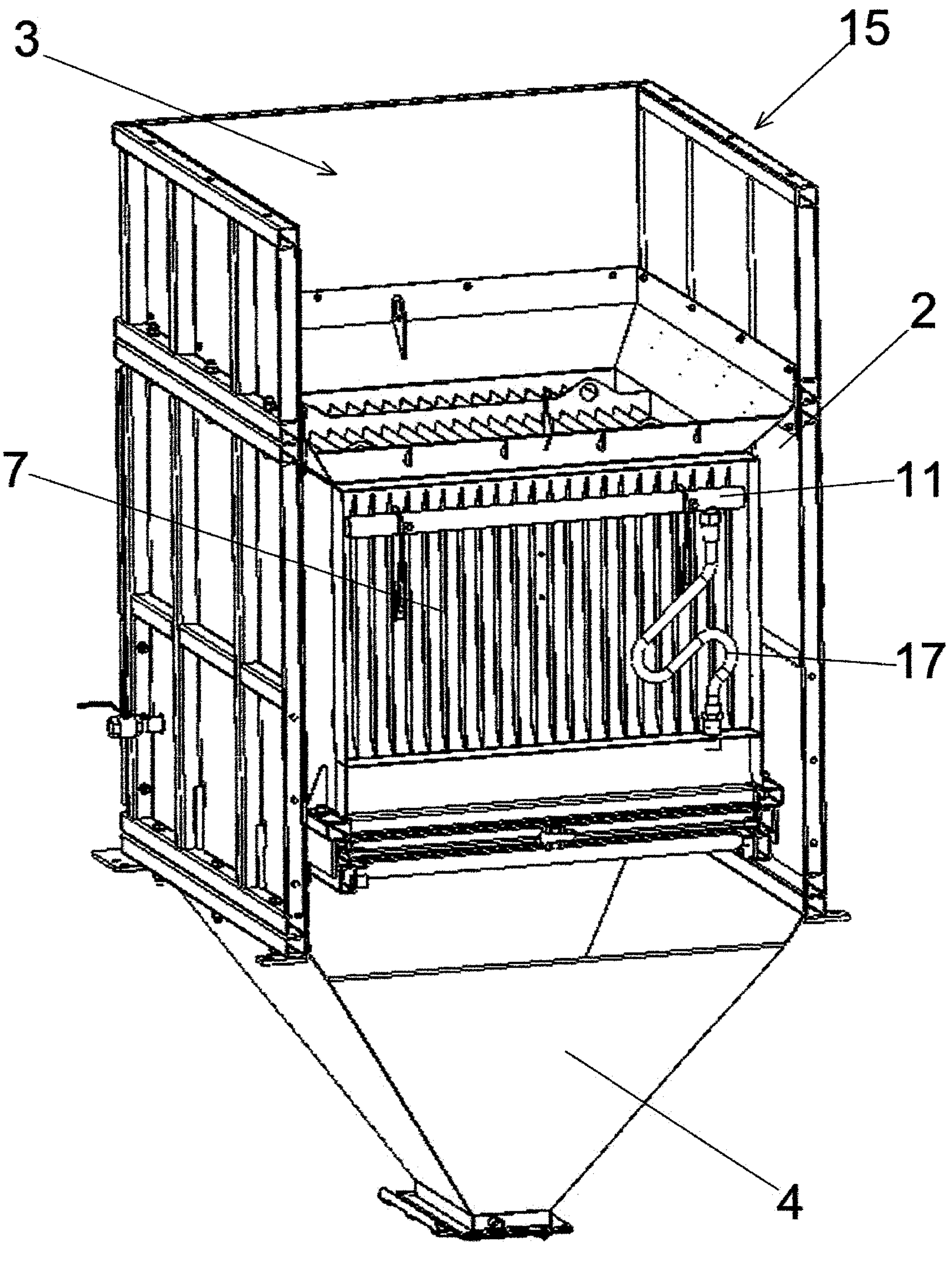
Figure 4:
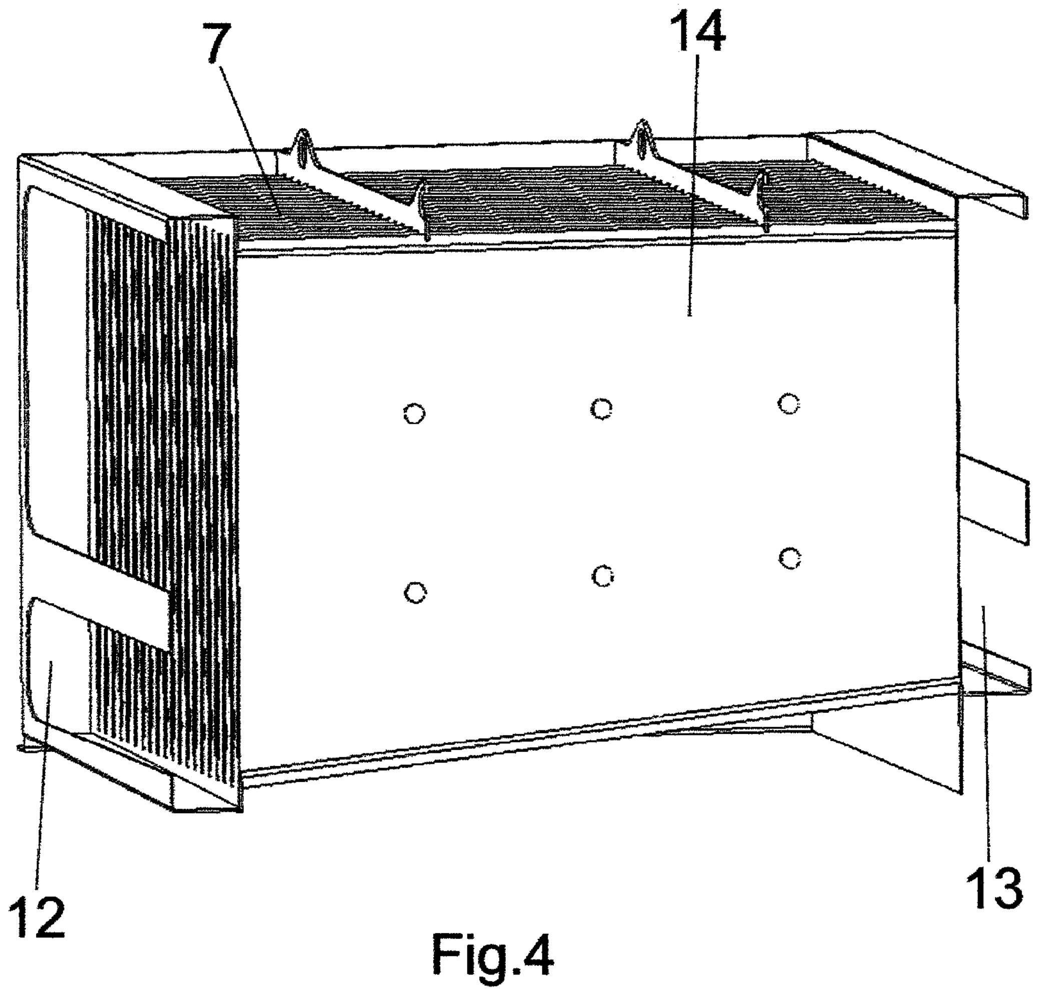

The invention will be illuminated in more detail by means of the drawings where FIG. 1 shows a front view of the heater supplemented with a diagram of connection of the source of evaporation residues, FIG. 2 and FIG. 3 show the heater in 3D views with partial sectional views, FIG. 4 shows a 3D view of the evaporation residue exchanger.

EXAMPLES OF THE PERFORMANCE OF THE INVENTION

The oilseed heater (FIG. 1, FIG. 2, FIG. 3, FIG. 4) consists of an insulated jacket 2 in which material inlet 3, material outlet 4, heating medium inlet 5 and air outlet 6 are arranged. Inside the insulated jacket 2 there is a plate-type exchanger 7 for condensation of evaporation residues which is, through the heating medium inlet 5 using an insulated pipe 8 connected with the source 1 of the waste evaporation residues, i.e. with a device to process biological materials—oilseed extruder.

The heater 15 further contains a condensate exhaust 9 and a cleaning bar 11 for cleaning the inner section of the plates. Using a hose 17, the cleaning bar 11 is connected with a steam generator or with a source of hot water. The cleaning bar 11 is provided with holes which are directed to the inside of the exchanger 7 for condensation of evaporation residues.

Under the exchanger 7 for condensation of evaporation residues, there is a travelling grate 10 that is connected to a driving mechanism 16 (the piston rod) and which can, optionally, be heated with pressurized steam to further increase the capacity of the whole heater 15.

The heater 15 also contains a temperature sensor arranged at the material inlet 43.

The air outlet 6 is provided with a device facilitating forced exhaust (not shown) the capacity of which can be regulated.

The exchanger 7 for condensation of evaporation residues contains a distribution space 12 and a space 13 for air and condensate exhaust.

In order to increase the capacity, the heater 15 is further connected to a pressurized steam generator (not shown).

The heater 15 works as follows: At first, evaporation residue is generated in the source 1 of evaporation residues, i.e. in the oilseed extruder on the understanding that the evaporation residue is then conducted into the plate-type exchanger 7 for condensation of evaporation residues in which the evaporation residue condensates and generates heat which pre-heats oilseeds passing between individual plates 14 of the exchanger 7 for condensation of evaporation residues.

The oilseeds are then conveyed to the material inlet 3 and then they fall through the plate-type exchanger 7 for condensation of evaporation residues. The plate-type exchanger 7 contains special thin stainless steel plates 14 into which the waste evaporation residue from the oilseed extruder is driven. Here, the evaporation residue condensates whereby it transfers heat to the oilseeds. From the space 13 for air and condensate exhaust, the condensate is conducted away to the drain-pipe, through the condensate exhaust 9. The residual air is also exhausted through the air outlet 6. Then the oilseeds fall out through the material outlet 4 to be further processed.

INDUSTRIAL APPLICATION

The heater according to this invention can be used for heating loose materials, especially for heating biological materials such as, for example, oilseeds.

LIST OF REFERENCE MARKS

1 Source of Evaporation Residues
2 Insulated Jacket
3 Material Inlet
4 Material Outlet
5 Heating Medium Inlet
6 Air Outlet
7 Exchanger for Condensation of Evaporation Residues
8 Insulated Pipe
9 Condensate Exhaust
10 Travelling Grate
11 Cleaning Bar
12 Distribution Space
13 Space for Air and Condensate Exhaust
14 Exchanger Plate
15 Heater
16 Driving Mechanism
17 Hose

The invention claimed is:

1. An oilseed heater for heating oilseeds, comprising
an insulated jacket which contains a material inlet,
a material outlet,
a heating medium inlet and
an air outlet and
where at least one exchanger is arranged inside the insulated jacket and the exchanger is an exchanger for condensation of evaporation residues connected with a source of evaporation residues,
wherein the source of evaporation residues includes a device configured to process biological materials having at least some humidity, and which, by such processing, generates evaporation residues that generate waste heat in the form of a mixture of air and water vapor at atmospheric pressure,
wherein the exchanger is configured to conduct the evaporation residues generated by the source of evaporation residues from the heating medium inlet to the air outlet as oilseeds pass through the oilseed heater from the material inlet to the material outlet,
wherein the exchanger is configured such that the evaporation residues condensate and generate heat to heat the oilseeds as the oilseeds pass through the oilseed heater.

2. The heater according to claim 1, wherein the source of the evaporation residues includes an oilseed extruder, a crusher/masher or a drier.

3. The heater according to claim 1, wherein the exchanger for condensation of evaporation residues is a plate-type exchanger.

4. The heater according to claim 1, wherein the exchanger for condensation of evaporation residues is connected, using an insulated pipe, with the source of evaporation residues.

5. The heater according to claim 1, further comprising a condensate exhaust.

6. The heater according to claim 1, wherein at least one travelling grate is arranged under the exchanger for condensation of evaporation residues.

7. The heater according to claim 1, further comprising a cleaning bar.

8. The heater according to claim 1, wherein a cleaning bar is provided with holes which are directed to the inside of the exchanger for condensation of evaporation residues.

9. The heater according to claim 1, further comprising a temperature sensor arranged at the material outlet.

10. The heater according to claim 1, wherein the air outlet includes a forced exhaust device.

11. The heater according to claim 1, wherein the exchanger for condensation of evaporation residues contains a distribution space and a space for air and condensate exhaust.

* * * * *